United States Patent
Park et al.

(10) Patent No.: US 9,818,113 B2
(45) Date of Patent: Nov. 14, 2017

(54) PAYMENT METHOD USING ONE-TIME CARD INFORMATION

(71) Applicants: Shinhancard Co., Ltd., Seoul (KR); KB Kookmincard Co., Ltd., Seoul (KR); Hyundai Card Co., Ltd., Seoul (KR)

(72) Inventors: Hae Chul Park, Seoul (KR); Byungsoo Kim, Seoul (KR); Jeongjin Lee, Seoul (KR)

(73) Assignees: Shinhancard Co., Ltd., Seoul (KR); KB Kookmincard Co., Ltd., Seoul (KR); Hyundai Card Co., Ltd., Seoul (KR); Samsung Card Co., Ltd., Seoul (KR); Lotte Card Co., Ltd., Seoul (KR); Nonghyup Bank, Seoul (KR)

(*) Notice: Subject to any disclaimer, the term of this patent is extended or adjusted under 35 U.S.C. 154(b) by 774 days.

(21) Appl. No.: 14/286,630

(22) Filed: May 23, 2014

(65) Prior Publication Data

US 2014/0258135 A1    Sep. 11, 2014

Related U.S. Application Data

(63) Continuation of application No. PCT/KR2012/011674, filed on Dec. 28, 2012.

(30) Foreign Application Priority Data

Dec. 10, 2012  (KR) .................. 10-2012-0142467

(51) Int. Cl.
*G06K 7/00* (2006.01)
*G06Q 20/40* (2012.01)
(Continued)

(52) U.S. Cl.
CPC ......... *G06Q 20/401* (2013.01); *G06Q 20/027* (2013.01); *G06Q 20/382* (2013.01); *G06Q 20/385* (2013.01); *G06Q 2220/00* (2013.01)

(58) Field of Classification Search
USPC .................. 235/375, 379, 380; 705/5, 35–45
See application file for complete search history.

(56) References Cited

U.S. PATENT DOCUMENTS

| | | | | |
|---|---|---|---|---|
| 5,949,044 A | * | 9/1999 | Walker | ............... G06Q 20/10 235/379 |
| 2006/0242698 A1 | * | 10/2006 | Inskeep | ............... G06Q 20/341 726/20 |

(Continued)

FOREIGN PATENT DOCUMENTS

| KR | 10-2005-0006131 A | 1/2005 |
|---|---|---|
| KR | 10-2006-0117902 A | 11/2006 |

(Continued)

*Primary Examiner* — Matthew Mikels
(74) *Attorney, Agent, or Firm* — Locke Lord LLP; Christopher J. Capelli; Daniel J. Fiorello

(57) ABSTRACT

Provided is a payment method using one-time information, which is performed by a payment system network-connected to a relay server and a payment device and having actual card information, the method including: receiving a payment schedule message from the payment device; publishing a Bank Information Number in response to the payment schedule message, generating one-time card information not including the actual card information, and providing the generated one-time card information to the payment device; judging validity of a message for approval request transmitted from the relay server according to whether or not a difference between a first time when the one-time card information is returned through the relay sever and a second time when the one-time card information is provided to the payment device satisfies a predetermined reference time; and determining whether or not the message for approval (Continued)

request is approved according to a judgment result of the validity.

22 Claims, 12 Drawing Sheets

(51) Int. Cl.
    *G06Q 20/38*          (2012.01)
    *G06Q 20/02*          (2012.01)

(56) References Cited

U.S. PATENT DOCUMENTS

| | | | | |
|---|---|---|---|---|
| 2007/0114274 A1* | 5/2007 | Gibbs | .................... | G06Q 20/12 235/380 |
| 2012/0254041 A1* | 10/2012 | Saxena | ................ | G06Q 20/385 705/64 |
| 2013/0346222 A1* | 12/2013 | Ran | ........................ | G06Q 20/20 705/17 |

FOREIGN PATENT DOCUMENTS

| KR | 10-2009-0036560 A | 4/2009 |
|---|---|---|
| KR | 10-2009-0102752 A | 9/2009 |
| KR | 10-2012-0105296 A | 9/2012 |

\* cited by examiner

TRACK-2

| 1 | P A N | P A N |
|---|---|---|
| 2 | EXPIRED DATA | E·D |
| 3 | SERVICE CODE | S·C |
| 4 | STATIC CVC | D·D |
| 5 | ATC | |
| 6 | RANDOM NUMBER | |

PAYMENT METHOD USING ONE-TIME CARD INFORMATION

CROSS REFERENCE TO RELATED APPLICATIONS

This application is a continuation of International Application No. PCT/KR2012/011674 filed on Dec. 28, 2012, which claims priority to Korean Application No. 10-2012-0142467 filed Dec. 10, 2012, which application are incorporated herein by reference.

TECHNICAL FIELD

The present invention relates, in general, to a payment method, more particularly, to a payment method using one-time card information which enables a payment device, such as a smart phone or a cellular phone to proceed with a payment in a mobile environment using one-time card information provided from a card company sever so that actual card information can be prevented from being exposed to unauthorized persons, and accordingly, the security of mobile payment environments can be improved. Unlike cash which increases in volume in proportion to the sum of money necessary for payment, in the case of a credit card a certain sum of money necessary for payment can be paid with an individual credit card, and accordingly, it is convenient to use and carry the credit card and such a credit card has been widely used as a payment means for replacing cash.

BACKGROUND ART

Generally, after a credit card has been issued from a card company or a bank, there is no almost limit in using the credit card if only the validity of the credit card is verified by placing the credit card in contact with (or close to) a credit card reader in a shop or other point of purchase connected online to a server.

However, despite the high convenience of a credit card, a credit card also has some bad points.

For example, in the case of a magnetic credit card, most of the user's card information is recorded into the magnetic strip on the card, and thus if there is an apparatus capable of reading the magnetic strip on the card, the card information can be illegally used by unauthorized persons.

As an alternative for a magnetic credit card, a smart card (or an IC card) in which an IC (Integrated Circuit) is embedded has come into use. The smart card has the advantage of improved security compared to the magnetic credit card, but it is disadvantageous in that expenses incurred for the necessary infrastructure construction thereof are high compared to the magnetic credit card.

Since both a magnetic credit card and an electronic credit card are carried and used by a person, there is a risk that they may be lost or stolen. In a case where credit cards are lost, they can be illegally used by unauthorized persons.

Also, when a credit card is used on the internet, payment is mainly performed based on only card number and validity date information, and thus owner information associated with the card number and validity date must be managed not to be exposed to unauthorized parties.

With regard to this problem, Korean Laid-Open Patent Publication No. 10-2002-0096353 discloses that a one-time virtual card is issued to a portable terminal so that payment can be performed by the portable terminal using a one-time virtual card number.

To do so, Korean Laid-Open Patent Publication No. 10-2002-0096353 has suggested a one-time virtual card service system and a method thereof, the system being configured such that a proper ID of a portable terminal, private information, and actual card information are provided to an issuing server, a one-time virtual card is generated after a user has been identified by the issuing server, and the generated one-time virtual card number is obtained from the issuing server in such a manner that a one-time virtual card number is generated whenever the user of the portable terminal pays for an expense.

However, in Korean Laid-Open Patent Publication No. 10-2002-0096353, since a VAN (Value Added Network) server must inquire about the validity of a one-time virtual card number to the issuing server from which the one-time virtual card number is issued after receiving the one-time virtual card number from a card reader, and a relay server must verify the validity of the one-time virtual card number through the issuing server. As such, the existing payment system is not completely used, but an additional issuing server is involved in the existing payment system, and the relay server must verify a one-time virtual card number after inquiring about validity thereof to the issuing server, and thereafter the existing payment system is used.

In addition to this, in Korean Laid-Open Patent Publication No. 10-2002-0096353, a one-time virtual card number must be issued whenever payment is performed using a portable terminal, and accordingly, it cannot be deemed convenient to use the one-time virtual card number compared to use of an actual card.

SUMMARY

Accordingly, an object of the present invention is to provide a payment method using one-time card information which enables credit transactions to be performed using one-time card information instead of actual card information in mobile environments so that card information can be prevented from being exposed to unauthorized parties, and accordingly, security for credit transactions in mobile environments can be improved.

In order to accomplish the above object, the present invention provides a payment method, which is performed by a payment system network-connected to a relay server and a payment device and having card information on an actual card corresponding to the payment device, the method including steps of: receiving a payment schedule message from the payment device; publishing a Bank Information Number in response to the payment schedule message, generating one-time card information not including information on the actual card and providing the generated one-time information to the payment device; judging validity of a message for approval request transmitted from the relay server according to whether or not a difference in time between a first time when the one-time card information is returned through the relay server and a second time when the one-time card information is provided to the payment device satisfies a predetermined reference time; and determining whether or not the message for approval request of payment is accepted according to a result of the validity judgment.

According to the above object, the present invention provides a payment method, which is performed by a mobile payment system network-connected to a relay server and a payment device, and having card information of an actual card corresponding to the payment device, the method including: dividing a PAN (Primary Account Number) region of track 2 information into a first region including a BIN (Bank Information Number), a second region and a third region which are remaining regions except for the first region including the BIN when one-time card information is requested from the payment device; encrypting any one of the second region and the third region except for the first region to form dynamic track 2 information; decrypting any one of the second region and the third region to constitute the track 2 information when the dynamic track 2 information is provided to the payment device and is returned from the relay server; and judging a settlement account of the payment device with reference to the decrypted track 2 information.

According to the present invention, card information is not needed to be saved in payment devices, such as smart phones and portable phones, and payment is performed using one-time card information provided from a card company sever so that an existing payment network leading to a card reader and a relay server can be used as it is, and security of mobile payment environments can be improved.

DETAILED DESCRIPTION

Figure 1:
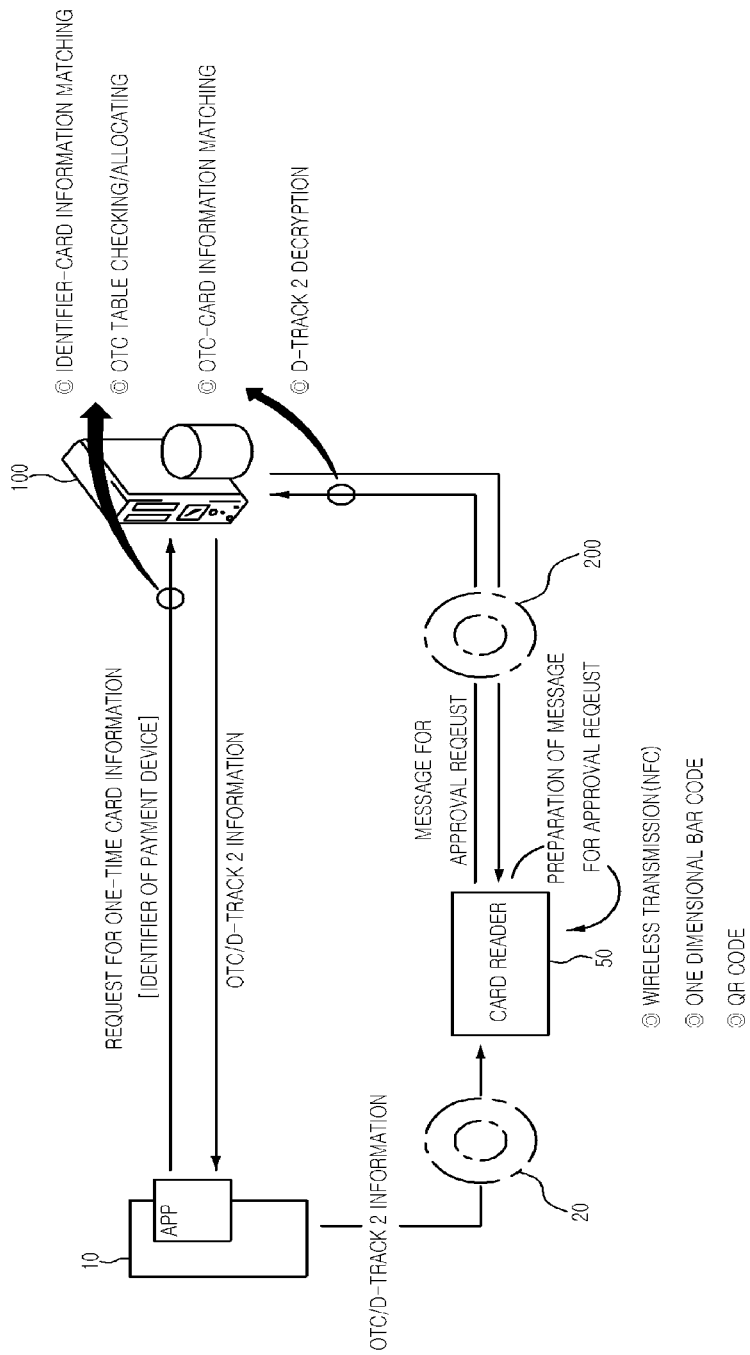
FIG. 1 illustrates a schematic diagram for a payment method using one-time card information according to an embodiment of the present invention.

A payment device described in this specification may refer to a device capable of performing payment in mobile environments. Examples of the device capable of performing payment in mobile environments are devices, such as mobile phones, smart phones, notebook computers and PDAs (Personal Digital Assistants), and in addition to this, the device may refer to devices that can perform wireless communication and may also refer to a portable device among devices in which a USIM (Universal Subscriber Identity Module) chip or a financial chip for replacing credit cards in financial companies is mounted.

"A credit card" mentioned in this specification may mean a credit card itself and a portable terminal for replacing the credit card.

If a device can enable payment to be carried through a portable terminal in a mobile payment environment even though the portable terminal has no separate financial chip, and can transmit track 2 information of ISO/IEC 7813 which is a data standard of a credit card to a card reader or a card company server, this device may be referred to as "a credit card."

That is, the credit card mentioned in this specification may refer to a magnetic credit card, an electronic credit card and a portable terminal that enables payment to be performed in a mobile environment, and the meaning thereof should not be limited to a medium in a card form.

A relay server mentioned in this specification may mean a server provided between a card reader and a card company server. Also, the relay server may mean a POS (Point of Sales System) server that is network-connected to a card company server or a VAN server. The relay server may be a VAN (Value Added Network) server that collects and manages sales statements on behalf of each card company when payment data is transmitted from a card reader to a card company server, and checks card company information from the payment data transmitted from the card reader and provides the payment data to the corresponding card company server.

A card reader mentioned in this specification may be a card reader that reads track 2 information from an existing MS (Magnetic Strip) credit card, a card reader that is connected to an IC chip embedded in an existing electronic credit card and reads track 2 information, or a card reader that carries out radio communications with portable terminals, such as cellular phones or smart phones to obtain track 2 information from the portable terminals.

Accordingly, the card reader may mean a device that is connected to the magnetic strip credit card to obtain track 2 information having a standard of ISO/IEC 7813, or a device that is connected to or is close to any one of an electronic credit card and a portable terminal in which a USIM chip or a financial chip is embedded, and reads one-time card information according to the present invention, thereby transmitting the one-time card information to a card company server through a relay server.

Track 2 information mentioned in this specification may mean data according to a standard of ISO/IEC 7813.

A payment device mentioned in this specification may carry out a near field communication with a card reader. At this time, the payment device may be configured such that a chip having an NFC (Near Field Communication) function is separately embedded in a portable terminal or the payment device is integrally formed with a USIM chip.

Dynamic track 2 information mentioned in the present invention may mean information formed by encrypting a PAN (Primary Account Number) region except for a BIN (Bank Information Number) or track 2 information except for the BIN from track 2 information having a standard of ISO/IEC 7813 and composed of the PAN region, an ED (Expired Data) region, a SC (Service Code) region and a DD (Discretionary Data) region.

Hereinafter, the present invention will be described with reference to the drawings.

FIG. 1 illustrates a schematic diagram for a payment method using one-time card information according to an embodiment of the present invention.

Referring to FIG. 1, a payment method using one-time card information according to the present embodiment is performed in such a manner that a payment application 11 is first driven by a payment device 10, one-time card information is requested from the payment application 11 to a card company server 100, and the card company server 100 recognizes the payment device 10 by obtaining an identifier of the payment device 10 from the payment application 11.

The identifier of the payment device 10 may be one of a telephone number, an ESN (Electrical Serial Number), a UUID (Universal Unique Identifier) and a MAC Address, and in the case of a cellular phone or a smart phone, a telephone number or an ESN may be used as the identifier, and in the case of a tablet PC, a UUID may be used as the identifier. The card company server 100 maps the identifier of the payment device 10 with card information, and judges a card holder who has requested one-time card information based on actual card information associated with the identifier of the payment device 10 when the one-time card information is requested from the payment application 11 installed in the payment device 10.

The one-time card information refers to information transmitted from the card company sever 100 to the payment device 10, namely, in order to perform a single payment, unique one-time card information is generated from the card company server 100, and the generated one-time card information may be provided to the payment device 10. The payment device 10 or the payment application does not need to be provided with any kind of card information.

Similarly, the payment application 11 installed in the payment device 10 does not require card information contained in actual credit card. The payment device 10 may request payment while providing the one-time card information obtained from the card company server 100 to a card reader 50, and the card reader 50 may prepare a message for approval request by adding affiliate member information and settlement fee information to the one-time card information and may provide the prepared message for approval request to the card company sever 100 through a relay server 150.

Also, since the one-time card information according to the present embodiment includes only a part (i.e. BIN: Bank Information Number) of card information on an actual credit card, and a remaining part of the card information corresponds to a one-time number corresponding to the actual credit card, even if the corresponding one-time number is exposed to unauthorized persons, there is no concern that the exposed one-time number will be misused.

In addition, the card company server 100 judges whether or not the one-time card information provided to the payment device 10 is returned through the relay server 150 within a predetermined reference time (e.g. three minutes) on the basis of a time when the one-time card information is provided to the payment device 10. In the present invention, when the one-time card information is not returned through the relay server 150 within the reference time after the one-time card information has been issued from the card company server 100 to the payment device 10, the message for approval request received through the relay server 150 may not be provided.

Meanwhile, even if one-time card information is illegally obtained by unauthorized persons, there is no possibility to illegally use the one-time card information because the one-time card information is newly issued whenever payment is performed by bringing the payment device 10 into contact with (or close to) the card reader 50.

Also, the card company server 100 may not issue one-time card information according to a certain rule, and accordingly, even if unauthorized persons repetitively obtain one-time card information many times, when, for example, mobile transactions are carried out by the payment device 10, unlike encrypted or decrypted information, subsequent one-time card information of the payment device 10 cannot be accurately predicted.

Since the card company server 100 generates and provides one-time card information whenever payment is requested from many payment devices, one-time card information requested from the payment device 10 may be inconsistent, and a method of generating one-time card information using one number table, a method of generating one-time card information using two or more number table, a method of encrypting card information on a card holder's credit card, a method of generating one-time card information by generating a random number whenever one-time card information is requested and encrypting the random number, and the like may be used as a method of issuing one-time card information from the card company server 100. This will be described with reference to FIGS. 2 to 5.

Figure 2:
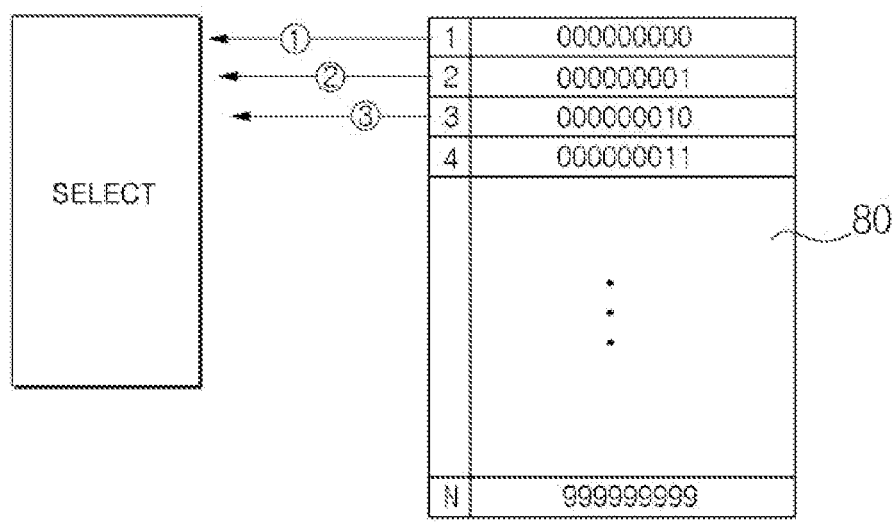
FIGS. 2 to 5 illustrate reference views for one example in which one-time card information is generated.

First, FIG. 2 illustrates a method of using a number table, and shows that the card company server 100 generates virtual numbers in a form of the number table 80, and thereafter, provides the numbers generated in the number table 80 in the order of when they were requested whenever one-time card information is requested from many payment devices.

The digits in the number table 80 may increase one by one from a starting digit set by the card company server 100 in a form in which a next digit is increased up to +1 at a time. In this case, the digits may be digits ranging from 0000000 to 9999999. The number table 80 may be composed of numbers, each of which is composed of 7 digits, and follows a seven-digit card number after a BIN in the existing credit card system. Here, the number table 80 may be configured in such a manner that digits ranging from 0000000 to 9999999 are generated in order, or digits are filled with virtual digits.

The number table 80 alternatively gives a number in order whenever one-time card information is requested from the payment device 10, and thus provides the giving number to the payment device 10. However, when a plurality of payment devices exist and one-time card information is requested from each of the payment devices, a giving number may be alternatively given in the order of one-time card information being requested. Accordingly, when one-time card information is requested from a plurality of payment devices, it is difficult for unauthorized persons to infer the numbers interchanged for each of the payment devices.

Figure 3:
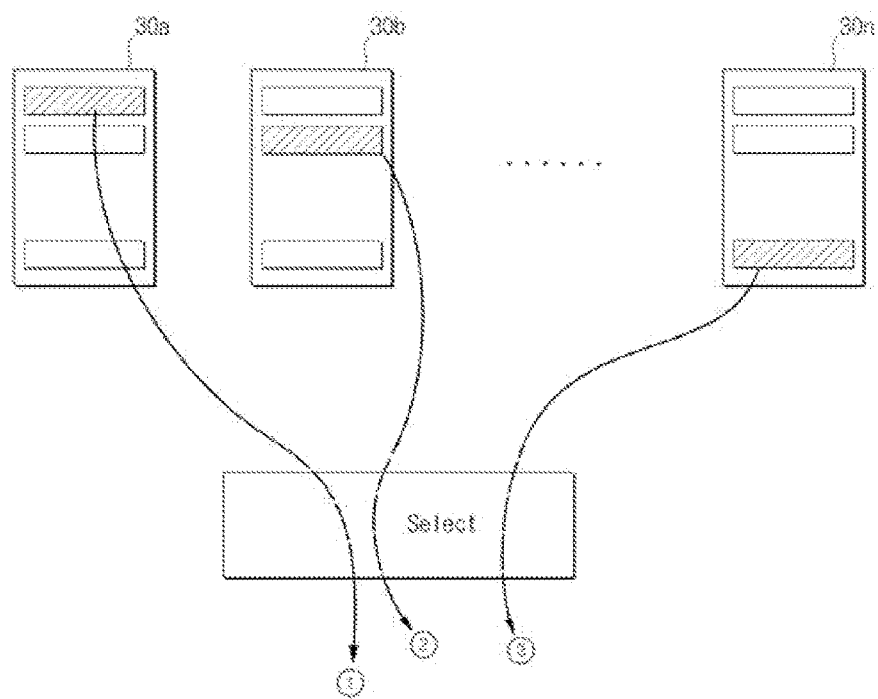

Next, FIG. 3 illustrates a method of using a plurality of number tables (30a to 30n). The card company server 100 may have a plurality of number tables (30a to 30n), and each of the number tables (30a to 30n) may be composed of digit strings from 0000000 to 9999999 in the same manner as the number table 80 in the form illustrated in FIG. 2 or may be composed of virtually generated digit strings. The card company server 100 may select a digit string from the different number tables (any one of 30a to 30n) whenever one-time card information is requested from the payment device 10, and the selected digit string may be provided as one-time card information to the payment device 10.

For example, when one-time card information is firstly requested from the payment device 10 to the card company server 100, one-time card information may be determined according to a route of No. ①, and when one-time card information is secondarily requested, one-time card information may be determined according to a route of No. ②.

On the other hand, in a case where many payment devices exist, when it is assumed that one-time card information is sequentially requested from each of the payment devices, the card company server 100 may transmit one-time card information resulting from each of the routes of Nos. ①, ① and ① to each of the payment devices according to the order of the one-time card information being requested.

Figure 4:
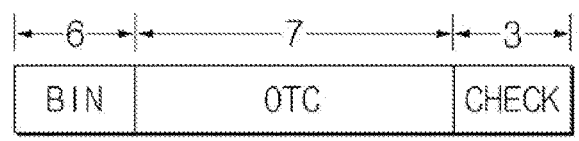

FIG. 4 illustrates a reference view for one example of one-time card information provided from the card company server to the payment device.

Referring to FIG. 4, one-time card information may be composed of a BIN (Bank Information Number) included in an actual card number, a seven-digit OTC (One Time Code), and a check sum. The BIN corresponds to a BIN included in an actual card number corresponding to the payment device 10. The BIN is neither encrypted nor altered in the card company server 100, and the BIN is included in one-time card information from the card company server 100 to the payment device 10 so as to be used when the relay server 150 judges a target (for example, a card company server) intended to transmit the message for approval request.

Figure 5:
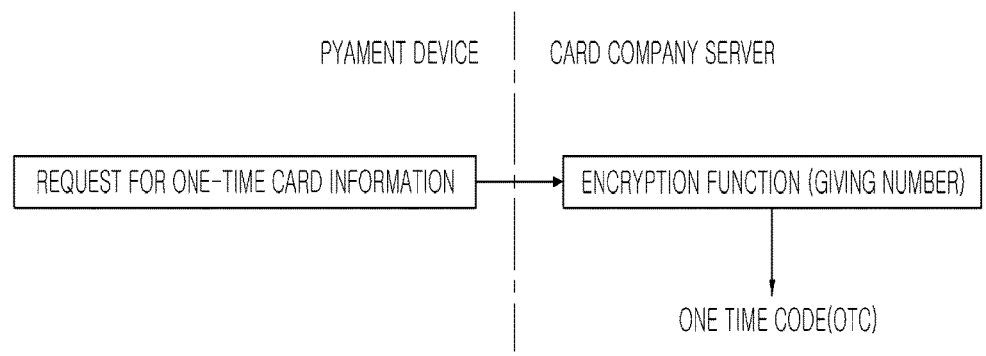

FIG. 5 shows one example in which the card company server 100 alternatively gives a virtual number and generates one-time card information by applying an encrypted function, for example, AES (Advanced Encryption Standard), RSA (Rivest Shamir Adleman), DES (Data Encryption Standard), TDES (Triple DES), and ARIA (Academy Research Institute Agency) algorithms, to the generated virtual number when one-time card information is requested from the payment device 10 to the card company server 100.

Figure 6:
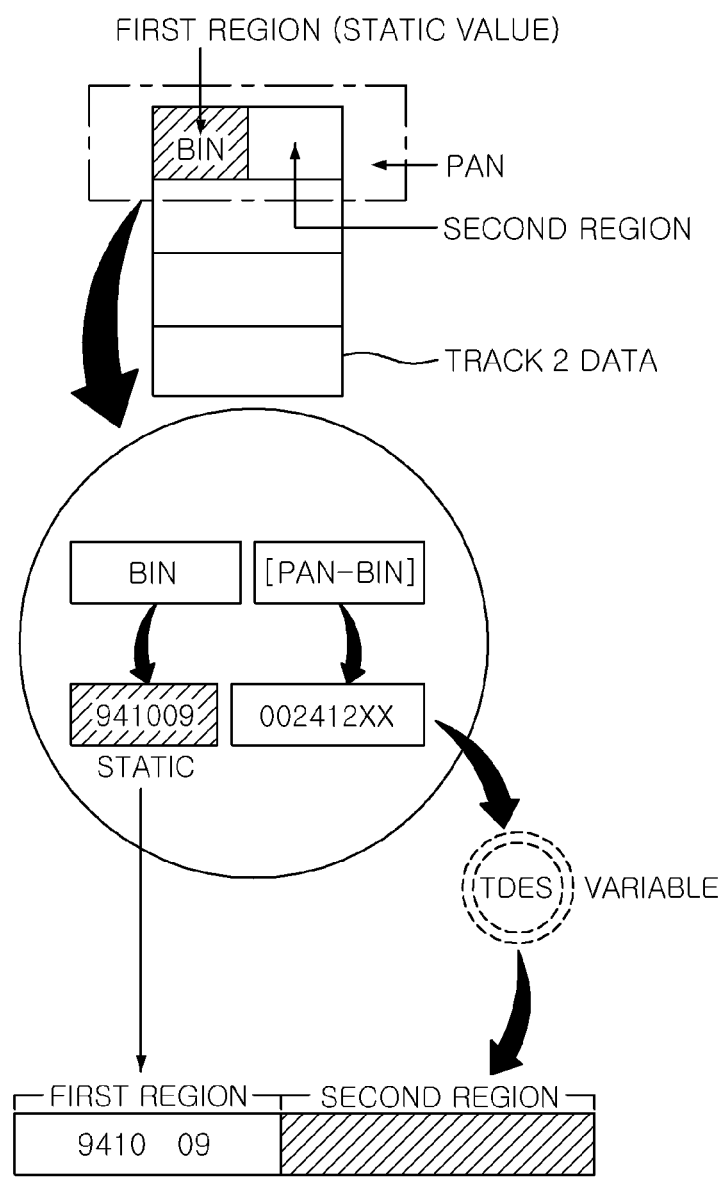
FIGS. 6 to 7 illustrate reference views for another example in which one-time card information is generated.
Figure 7:
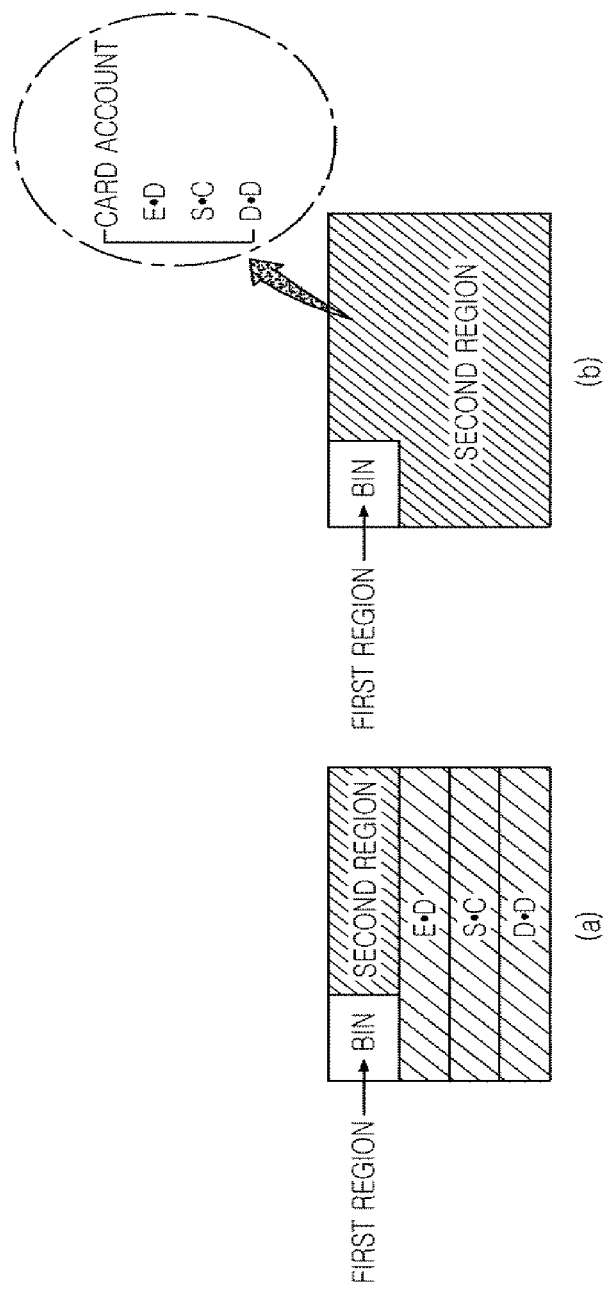

FIGS. 6 and 7 illustrate reference views for one example in which dynamic track 2 information is used as one-time card information.

First, FIG. 6 illustrates a reference view for a structure of a dynamic PAN (Primary Account Number) according to the embodiment of the present invention.

Referring to FIG. 6, the dynamic PAN is configured such that a PAN region in track 2 information having a standard of ISO/IEC 7813 and including a PAN (Primary Account Number) region, an ED (Expired Data) region, an SC (Service Code) region and a DD (Discretionary Data) region is divided into a first region (BIN) and a second region (PAN-BIN). The first region (BIN), may be a region including a BIN defining a card company and may have a length ranging from 4 to 10 bytes. The second region (PAN-BIN) may mean a remaining region except for the BIN in the PAN region and may include card account information of a credit card provided from a card reader 50. Here, the card account information of the credit card may be a card number of the credit card. In FIG. 6, The first region (BIN) of the PAN region has a static value.

The first region (BIN) may mean the first 8 digits among a 16-digit card number embossed or engraved in a credit card.

At this time, 16 digits of the card number may be imprinted on a surface of the credit card or may be in a data form recorded in a chip embedded in an electronic credit card. In a case of a portable terminal in which a USIM chip is embedded, a card number composed of a digit string having 16 digits may be saved in a USIM chip (or a separate memory).

The second region (PAN-BIN) of the PAN region has a static value. However, the value of the second region (PAN-BIN) may be changed to a dynamic value by an encryption algorithm driven in the payment device 10.

At this time, the encryption algorithm driven in the payment device 10 is one of AES, RSA, DES, TDES, ARIA algorithms, and the encryption algorithm will be hereinafter omitted.

That is, the dynamic PAN may have a form in which the first region (BIN) is combined with the second region (PAN-BIN) encrypted by the encryption algorithm, and as illustrated in the drawing, the second region (PAN-BIN) may have a master key prepared in the card company server or a derivation key derived from the master key. When the derivation key is used, the derivation key may correspond to a new modification key value derived from the master key prepared in the card company server 100, and in order to induce a derivation key value from the master key value, the aforesaid ATC, a random number and data of the PAN region (except for the BIN) may be needed.

When an encryption method for the PAN region has any one of a DES and IDES, a proper derivation key value may be calculated by only a hash function for which a master key value is needed. When the proper derivation key value is calculated, the card company server 100 may extract a PAN corresponding to an actual card by decrypting an encrypted dynamic PAN using the derivation key value.

In a state where the second region (PAN-BIN) is encrypted, even if the dynamic PAN is exposed from the card reader 50 or is exposed while being transmitted from the card reader 50 to the relay server 150, the encrypted PAN region cannot be decrypted unless the master key (or derivation key) prepared in the card company server 100 exists, and it is very difficult for the second region (PAN-BIN) to be decrypted by unauthorized persons unless the eavesdropper knows the same algorithm (a IDES algorithm) used for decryption of the card company server 100 using the master key.

FIG. 7 illustrates a reference view for a method of forming the second region in the PAN region.

First, (a) of FIG. 7 illustrates one example in which the payment device 10 forms the second region with regard to the PAN region.

In (a) of FIG. 7, track 2 information includes the PAN region, the ED (Expired Data) region, the SC (Service Code) region and the DD region, but the payment device 10 forms the second region with regard to only the PAN region except for the BIN, and the ED region, the SC region and the DD region are not divided into the second region.

When the Pan region is formed in such a method, a dynamic PAN may be formed of a card number having 16 digits embossed or engraved on a general credit card.

The payment device 10 in (b) of FIG. 7 may divide the PAN region including card account information in track 2 information, the ED region, the SC region and the DD region into the second region and may encrypt the second region by applying an encryption algorithm to the second region.

In both the dynamic PAN regions explained based on (a) of FIG. 7 and (b) of FIG. 7, the first region in which the BIN is described is not encrypted, and accordingly, the relay server 150 does not need to use a separate decryption algorithm or a master key for decryption. Also, after the relay server 150 has received a message for payment request provided from the card reader 50, the relay server 150 may immediately check if the received message for payment request should be transmitted to any card company server based on the BIN which is not encrypted.

Figure 8:
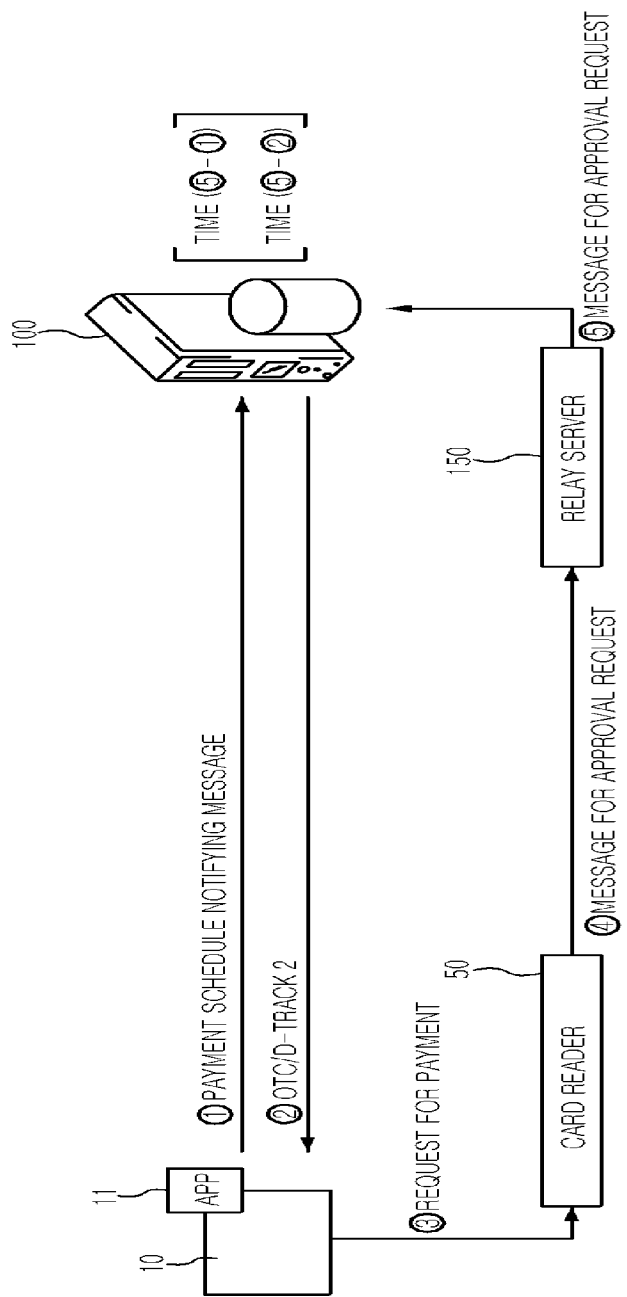
FIG. 8 illustrates a detailed schematic diagram for the payment method using one-time card information according to the embodiment of the present invention.

FIG. 8 illustrates a detailed schematic diagram for the payment method using one-time card information according to the embodiment of the present invention.

Referring to FIG. 8, the payment method using one-time card information according to the present embodiment may be performed in such a manner that the payment application installed in the payment device 10 is connected to the card company server 100, the card company server 100 judges a user of the payment device 10 and registered card information based on the payment application 11 installed in the payment device 10, and generates dynamic track 2 information using the card information or generates an OTC.

After the card company server 100 has generated dynamic track 2 information or the OTC, the card company server transmits dynamic track 2 information or the OTC to the payment application 11 installed in the payment device 10 through a telecommunication company server 200, and at this time, the card company server 100 may record a time when dynamic track 2 information or the OTC is transmitted.

When the payment device 10 comes into contact with or is close to the card reader 50, the payment application 11 provides dynamic track 2 information or the OTC to the card reader 50, namely, the payment application 11 may transmit dynamic track 2 information or the OTC provided through the card company server 100 to the card reader 50 as it is without saving it in memory 12 embedded in the payment device 10. Due to this, no card information is left in the payment device 10, thereby preventing a card holder from being exploited by an illegal use of his or her card information in situations, such as loss and theft of the payment device 10.

The payment terminal 50 receives dynamic track 2 information or the OTC through the payment application installed in the payment device 10, and prepares a message for approval request including settlement fee information and affiliate member information. Since both dynamic track 2 information and the OTC are generated so that BIN information is published, the relay server 150 may judge if the message for approval request should be transmitted to any card company server, and this means that there is no need to change the relay server or the card reader 50 in order to decrypt dynamic track 2 information, and also means that existing payment infrastructures 50, 150 may be completely used.

The card company server 100 calculates a difference between a time when one-time card information (dynamic track 2 information or the OTC) is transmitted to the payment application 11 installed in the payment device 10 and a time when the message for approval request (a one-time card number being included in the message for approval request) provided through the relay server 150 is received. Time validity for the one-time card information may be judged using the calculated difference in time. The time validity may be judged based on a standard that the difference in time ranges from one minute to ten minutes, but the difference in time may be smaller or larger than the mentioned range. When the time validity is admitted, the card company server 100 may transmit the message for approval request to the relay server 150 and when the time validity is not admitted, the card company server 100 may transmit a cancellation message to the relay server 150.

After the one-time card information generated according to the method presented based on FIGS. 2 to 7 has been provided to the payment application 11 installed in the payment device 10, the payment application 11 may wirelessly transmit the one-time card information to the card reader 50, may transmit the one-time card information to the card reader 50 using a one-dimensional bar code, or may transmit the one-time card information to the card reader 50 using a QR code. Of course, the payment application 11 may transmit the one-time card information along with track 2 information by adding the track 2 information to the one-time card information.

The card reader 50 prepares a message for approval request including settlement fee information, affiliate member information and the one-time card information obtained from the payment device 10 and transmits the prepared message for approval request to the relay server 150, and the relay server 150 judges if the message for approval request should be transmitted to any card company server with reference to the BIN (Bank Information Number) combined with the one-time card information.

As a result of the judgment, the relay server 150 sends the message for approval request to the corresponding card company server (for example, reference numeral "100"), and the card company server 100 judges actual card information for the one-time card information and judges whether or not a settlement fee requested in the message for approval request exceeds a payment amount limit, and an actual card number is a valid number. When it is judged that the actual card number for the one-time card information is valid, the card company server 100 sends the message for approval request to the card reader 50 through the relay server 150, and on the other hand, when the actual card number is not valid, a cancellation message may be forwarded.

Figure 9:
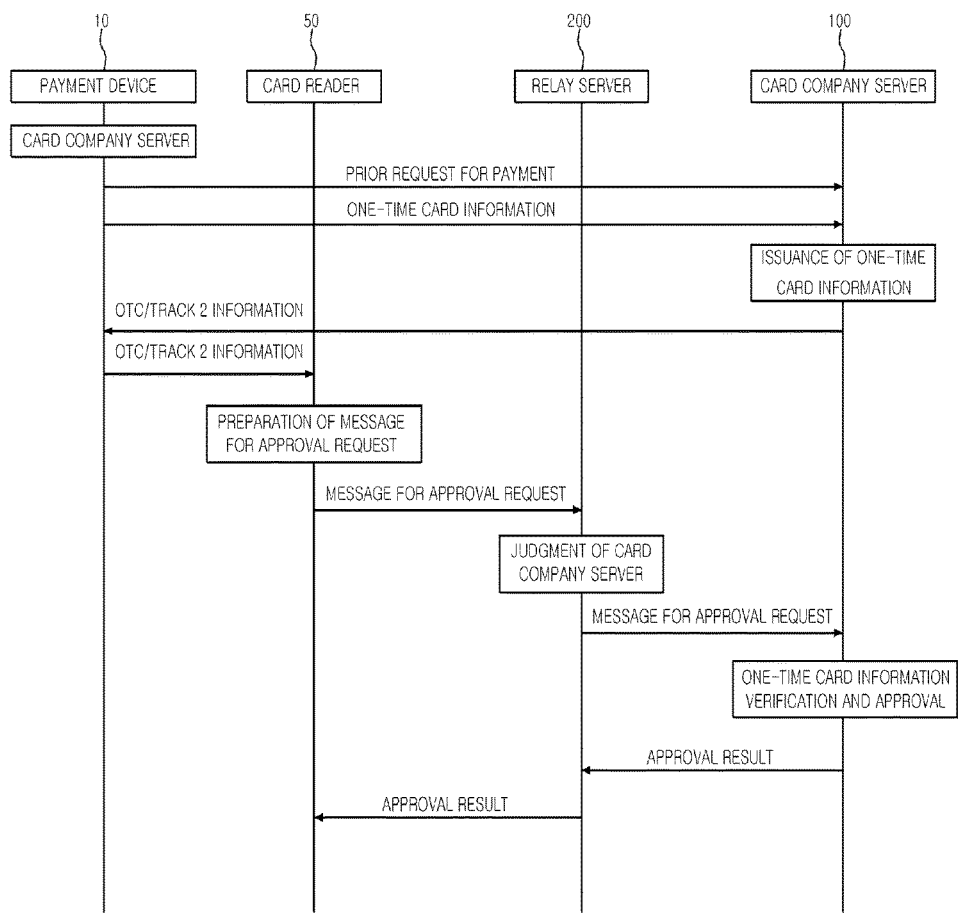
FIG. 9 illustrates a flow chart for the payment method using one-time card information according to the embodiment of the present invention.

FIG. 9 illustrates a flow chart for the payment method using one-time card information according to the embodiment of the present invention.

Referring to FIG. 9, the payment method using one-time card information according to the embodiment may be performed such a manner that the payment application 11 is driven by the payment device 10, and the payment device 10 notifies a prior message for payment request for the proceeding of payment to the card company server 10. After this, the payment application 10 is connected to the card company server 100 through a wireless network, thereby requesting one-time card information.

Next, when one-time card information is requested from the payment device 10, the card company server 100 obtains an identifier of the wireless connected payment device 10, and checks card information corresponding to the payment device 10. When the payment device 10 is a cellular phone or a smart phone, the identifier may be a telephone number of the device itself or an ESN (Electrical Serial Number), and when the payment device 10 is a tablet PC, the identifier may be a MAC ADDRESS or a UUID (Universal Unique Identifier).

When one-time card information is requested from the payment device 10, there is a need to register the payment device 10 in advance in order for the card company server 100 to judge card information corresponding to the payment device 10. The registration of the payment device 10 may be carried out in such a manner that a card holder may register the payment device directly at a financial company or may register the payment device online using a computer, or when the payment device 10 is a cellular phone or a smart phone, the card holder may register the payment device in a mobile environment. However, the registration of the payment device is not limited thereto.

Next, the card company server 100 may generate one-time card information according to one method of the methods (the method of using the OTC and the method of using D-Track 2 information) explained based on FIGS. 2 to 8 and may wirelessly transmit the generated one-time card information to the payment device 10. At this time, the card company server 100 may additionally extract track 2 information from card information corresponding to the payment device 10 and may transmit it to the payment device 10.

Next, the payment device 10 may provide the one-time card information (the OTC or dynamic track 2 information) to the card reader 50, and the card reader 50 may prepare a message for approval request including the one-time card information obtained from the payment device 10. The message for approval request may include affiliate member information and settlement fee information associated with the card reader 50.

Here, the card reader 50 may obtain one-time card information according to the following items.

1) When the payment device 10 transmits one-time card information (or track 2 information in addition thereto) using a NFC (Near Field Communication), the card reader may receive the one-time card information.

2) When the payment device 10 has a display device (for example, a cellular phone or a smart phone), one-time card information is displayed in a one-dimensional bar code form through the display device, and the card reader 50 obtains the one-time card information through a bar code reader 20.

3) When the payment device 10 has a display device, the payment device 10 displays one-time card information in a QR code form through the display device, and the card reader 50 obtains the one-time card information through the bar code reader 20.

Here, in the case of item Nos. 2) and 3), the card reader 50 should obtain the one-time card information through the bar code reader 20, and at this time, the card company server 100 should generate the one-time card information in a one-dimensional bar code form or a QR code form and should provide the generated one-time card information to the payment device 10.

The message for approval request prepared in the card reader 50 may be transmitted to the card company server 100 through the relay server 150, and the card company server 100 may judge and correct a mistake of the one-time card information with reference to check sum data illustrated in FIG. 8 after receiving the one-time card information from the relay server 150 and may check an actual card number corresponding to the one-time card information.

After checking the actual card number corresponding to the one-time card information, the card company server 100 may judge whether or not the actual card number is a valid card number, and as a result of judgment, when the actual card number is valid and a settlement fee included in the message for approval request is a sum of money within a payment amount limit, the card company server 100 may judge that the message for approval request has validity. When the message for approval request is valid, the card company server 100 may notify an approval result to the relay server 150.

Figure 10:
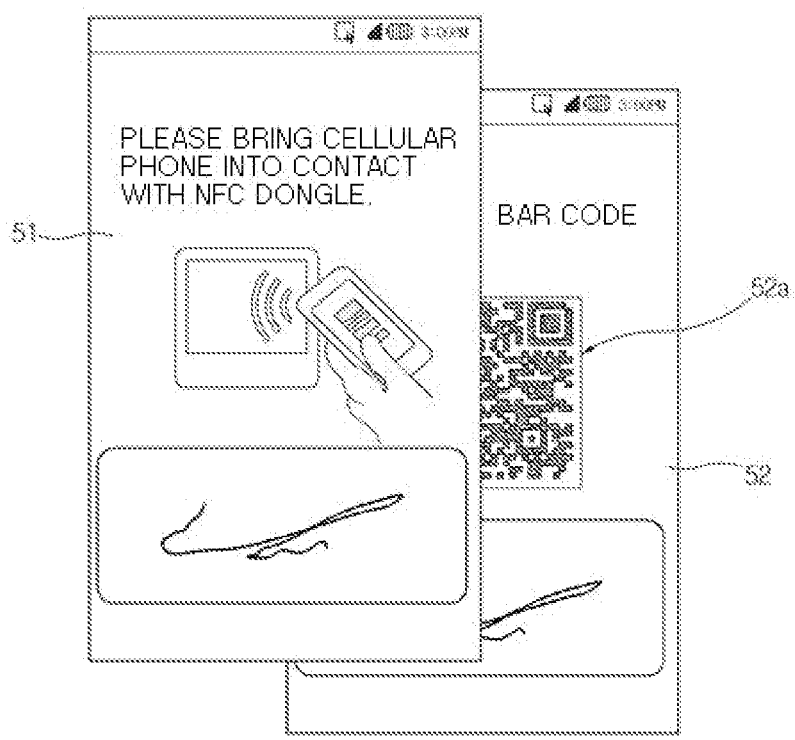
FIG. 10 is a reference view for one example in which one-time card information provided from a payment device to a card reader has a QR code form.

FIG. 10 is a reference view for one example in which one-time card information provided from the payment device to the card reader 50 has a QR code form. Referring to FIG. 10, the card company server 100 may provide dynamic track 2 information expressed in a QR code form to the payment device 10, the payment device may display dynamic track 2 information in the QR code form on a screen 52 and may transfer dynamic track 2 information to the card reader 50 by placing the screen 52 close to the bar code reader (for example, reference numeral 20 of FIG. 1) while a QR code 52a is displayed on the screen 52. At this time, a signature of the card holder along with the QR code may be displayed on the screen 52, and the signature displayed on the screen 52 is provided from the card company server 100 to the payment device 10, or when the screen 52 is a touch screen, the signature may be filled in by the card holder through touch input.

Figure 11:
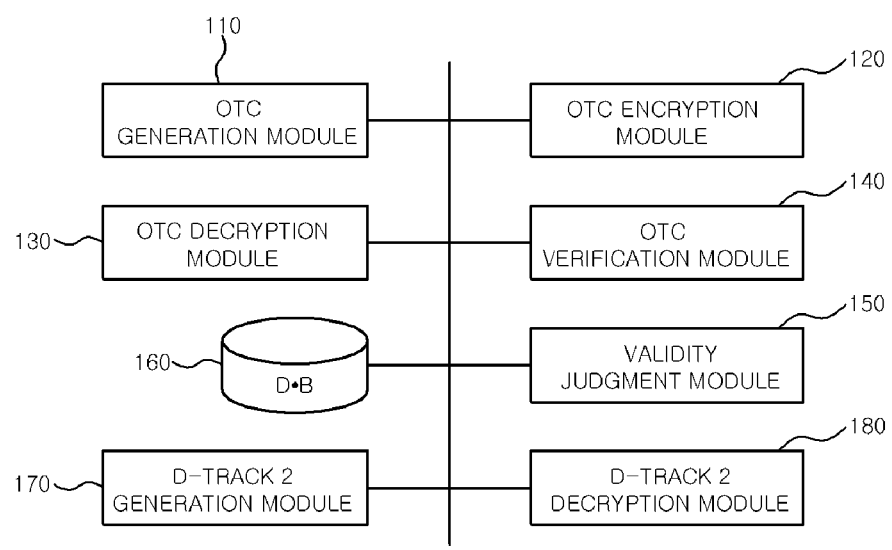
FIG. 11 illustrates a block diagram of a card company server according to the embodiment of the present invention.

FIG. 11 illustrates a block diagram of a card company server according to the embodiment of the present invention.

Referring to FIG. 11, the card company server 100 may include an OTC generation module 110, an OTC encryption module 120, an OTC decryption module 130, an OTC verification module 140, a validity judgment module 150, a database 160, a dynamic track 2 generation module 170 and a dynamic track 2 decryption module 180.

Registration information of the payment device 10 may be provided in the database 160. The registration information of the payment device 10 may include identifier information, such as telephone number information of the payment device, ESN information, UUID information, and MCD ADDRESS information. The identifier may include actual card information (for example, a card number, the card holder's information, an ATC, and a payment amount limit for a credit card) to be used in the payment device 10.

The OTC generation module 110 may generate one-time card information according to the method previously explained based on FIGS. 4 and 5 when the one-time card information is requested from the payment device 10. The generated one-time card information has no relationship with an actual card number or card information, except for the BIN, nor to the pattern resulting from a specific algorithm, and accordingly, even if the one-time card information is exposed to unauthorized persons, there is no concern that it will be illegally used by these persons.

The OTC encryption module 120 may encrypt one-time card information by AES (Advanced Encryption Standard), RSA (Rivest Shamir Adleman), DES (Data Encryption Standard), IDES (Triple DES), ARIA (Academy Research Institute Agency) algorithms.

Such an element corresponds to the case of FIGS. 4 and 5 as previously described, and corresponds to an element which may be omitted in the card company server 100 in a case where one-time card information is not encrypted.

When the one-time card information is encrypted in the OTC encryption module 120, and the encrypted one-time card information is returned to the card company server through the card company server, the payment device, the card reader and the relay server in order, the OTC decryption module 130 may decrypt the returned one-time card information. At this time, the OTC decryption module 130 may decrypt the returned one-time card information. At this time, a reverse encryption method (decryption method) regarding an encryption method used in the OTC encryption module 120 should be applied to the OTC decryption module 130.

The OTC verification module 140 may judge whether or not the one-time card information is a proper valve using check sum data shown in FIG. 8. The check sum data may be generated using a value of the one-time card information composed of a seven-digit string and may be configured in an ECC (Error Correcting Code) system. However, the check sum data is not limited thereto.

The validity judgment module 140 may judge whether or not a credit card is available with reference to account information saved in the database 160, and at this time, also judges whether or not a settlement fee included in the message for approval request exceeds a payment amount limit (for example, a daily use limit). As a result of judgment, when the settlement fee satisfies the payment amount limit and the credit card is valid, whether or not payment request is approved may be sent to the relay server 200.

The dynamic track 2 generation module 120 is a module that generates dynamic track 2 information when one-time card information provided from the card company server 100 to the payment device 10 is dynamic track 2 information, and generates a random number with reference to a time when the one-time card information (dynamic track 2 information) is requested from the payment device 10, and the generated random number, an ATC (Application Transaction Count) for a settlement fee of the payment device 10, track 2 information of card information of a pre-registered credit card in the database 150 are inputted and encrypted, thereby generating the encrypted dynamic track 2 information.

The dynamic track 2 information is wirelessly transmitted to the payment device 10 or is formed of a one-dimensional bar code or a QR code, the payment device 10 transmits the dynamic track 2 information to the card reader 50, and the card reader 50 prepares a message for approval request including the dynamic track 2 information, settlement fee information and affiliate member information, thereby transmitting the message for approval request to the relay server 150. The relay server 150 transmits the message for approval request to the card company server 100 using the BIN which is not encrypted in the dynamic track 2 information.

The dynamic track 2 decryption module 130 may obtain dynamic track 2 information from the message for approval request transmitted through the relay server 150 and may extract the track 2 information by decrypting the obtained dynamic track 2 information. The extracted track 2 information is provided to the validity judgment module 140, and the validity judgment module 140 judges whether or not a relevant credit card is available with reference to card information on an actual card saved in the database 150, and at this time, judges whether or not a settlement fee included in the message for approval request exceeds a payment amount limit (for example, a daily use limit). As a result of judgment, when the settlement fee satisfies the payment amount limit and the credit card is valid, the relay server 200 also judges whether or not the settlement fee exceeds the daily use limit. As a result of judgment, when the settlement fee is a fee within the payment amount limit, and the credit card is valid, whether or not the payment request is approved may be notified to the relay server 200.

Figures 12, 13:
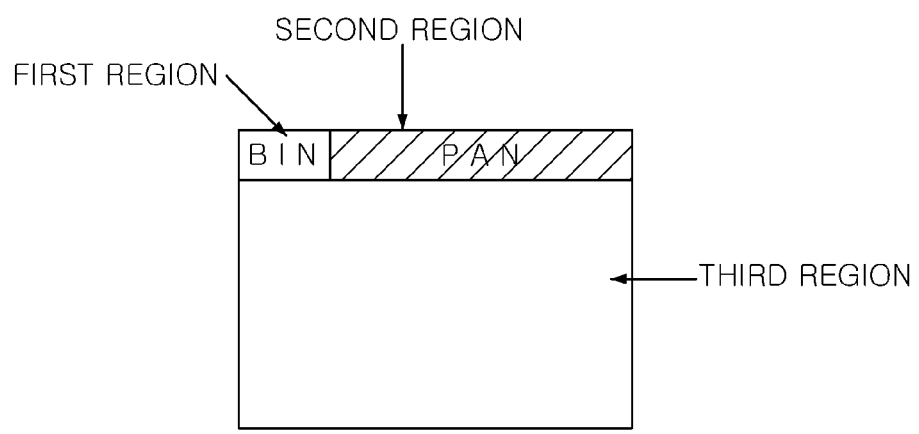
FIG. 12 illustrates a reference view for one example of dynamic track 2 information.
FIGS. 13 and 14 are reference views for methods of dividing track 2 information according to a standard of ISO/IEC7813 when one-time card information has a dynamic track 2 information form.

FIG. 12 illustrates a reference view for one example of dynamic track 2 information.

Referring to FIG. 12, dynamic track 2 information may composed of the PAN region, the ED region, the SC region and the DD region, and may include information necessary for encryption when the PAN region is encrypted in the card company server 100.

The AES (Advanced Encryption Standard), RSA (Rivest, Shamir, Adleman), DES (Data Encryption Standard), IDES (Triple DES), ARIA (Academy Research Institute Agency) algorithms and the like may be applied to the encryption of the PAN region, and in addition to the algorithms, various encryption algorithms may be applied.

A virtual random number may be needed for encryption of the PAN region, and in addition to this, an ATC (Application Transaction Count) requested from the payment device 10 to the card company server 100 may be used as an input value of an encryption algorithm. In this case, the virtual random number and the ATC may be arranged in the DD region which constitutes the dynamic track 2 information. The DD region may correspond to a data field which is arbitrarily available by a financial company, and a CVC (Card Verification Code) value of the credit card in addition to the virtual random number and the ATC may be included in the DD region.

When the message for approval request including the dynamic track 2 information of FIG. 12 is transmitted from the relay server 150, the card company server 100 may obtain a random number for decrypting the dynamic track 2 information and an ATC value from the DD region of the dynamic track 2 information included in the message for approval request using a structure of the dynamic track 2 information.

That is, the card company server 100 may decrypt dynamic track 2 information with reference to an ATC and a random number included in the DD region when dynamic track 2 information firstly transmitted to the payment device 10 is returned through the relay server 150.

Figure 14:
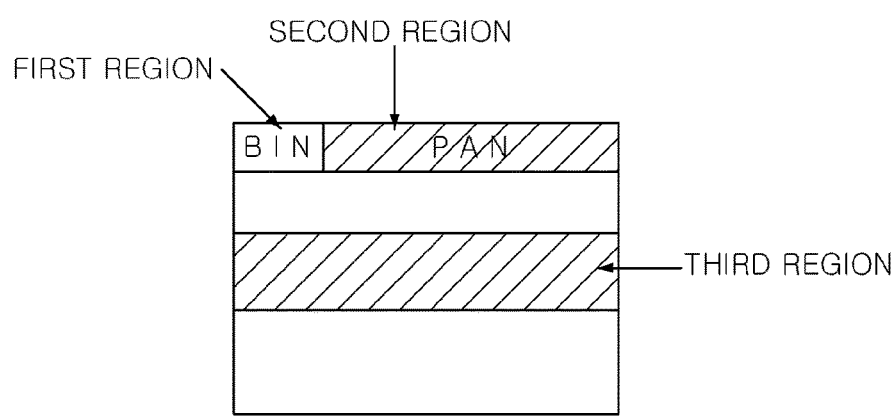

FIGS. 13 and 14 are reference views for methods of dividing track 2 information according to a standard of ISO/IEC7813 when one-time card information has a dynamic track 2 information form.

Referring to FIG. 13, track 2 information having a standard of ISO/IEC7813 may be configured such that:
  a BIN is divided into a first region,
  a remaining region except for the BIN in a PAN region is divided into a second region,
  a remaining region except for the first region and the second region in track 2 information is divided into a third region. In FIG. 13, dynamic track 2 information may encrypt only the second region.

Referring to FIG. 14, with regard to track 2 information according to a standard of ISO/IEC7813,
  the BIN may be divided into the first region,
  a remaining region except for the BIN in the PAN region may be divided into the second region,
  one region of the ED region, SC region, DD region may be divided into the third region. In this case, the second region or the third region may be a target for encryption, and an encryption function may be one of encryption functions according to the aforesaid AES (Advanced Encryption Standard), RSA (Rivest Shamir Adleman), DES (Data Encryption Standard), TDES (Triple DES), ARIA (Academy Research Institute Agency) algorithms.

According to the present invention, the payment method can be applied to a mobile credit transaction using a payment device, such as a mobile phone and a smart phone and can contribute to the revitalization of credit card companies and industries using mobile payment by improving security of mobile payment environments.

The invention claimed is:

1. A payment method using one-time information, which is performed by a payment system network-connected to a relay server and a payment device and having card information on an actual card corresponding to the payment device, the payment method comprising:
  receiving a payment schedule message from the payment device;
  publishing a BIN (Bank Information Number) in response to the payment schedule message, generating one-time card information not including the card information on the actual card, and providing the generated one-time card information to the payment device, wherein the one-time card information has a first number table and a second number table having number rows which are sequentially generated, and is a number row which is alternatively selected in order from the first table and the second table;
  judging validity of a message for approval request transmitted from the relay server according to whether or not a difference in time between a first time when the one-time card information is returned through the relay sever and a second time when the one-time card information is provided to the payment device satisfies a predetermined reference time; and
  determining whether or not the message for approval of request of payment is approved according to a judgment result of the validity.

2. The payment method of claim 1, wherein the predetermined reference time ranges from 0.1 seconds to 10 minutes.

3. The payment method of claim 1, wherein the payment device receives the one-time card information, and thereafter, provides the received one-time card information to a card reader.

4. The payment method of claim 1, wherein the payment device is any one of an electronic credit card having an IC (Integrated Circuit) chip and a portable terminal.

5. The payment method of claim 1, wherein the message for approval request comprises the one-time card information, affiliate member information and settlement fee information.

6. The payment method of claim 1, wherein the one-time card information has any one of a one-dimensional bar code form and a QR code form.

7. The payment method of claim 1, wherein the one-time card information is formed by adding a virtual number to the BIN.

8. The payment method of claim 1, wherein the generating of the one-time card information comprises:
   alternatively selecting a number in order from a number table prepared in advance when one-time card information for mobile payment is requested from the payment device; and
   generating the one-time card information by combining the alternatively selected number with the BIN.

9. The payment method of claim 1, wherein the number of the second number table is at least two.

10. The payment method of claim 8, wherein the one-time card information comprises the BIN, a number alternatively selected from the number tables, and an error correcting code.

11. The payment method of claim 10, further comprising verifying an error about the number alternatively selected in order from the number tables using the error correcting code.

12. The payment method of claim 8, further comprising encrypting the alternatively selected number.

13. The payment method of claim 12, wherein the encrypting encrypts the alternatively selected number according to any one algorithm of AES (Advanced Encryption Standard), RSA (Rivest, Shamir, Adleman), DES (Data Encryption Standard), TDES (Triple DES), ARIA (Academy Research Institute Agency) algorithms.

14. The payment method of claim 1, wherein the one-time card information is dynamic track 2 information formed by putting a BIN in track 2 information corresponding to unique information of the payment device in an open state and encrypting a PAN (Primary Account Number) except for the BIN.

15. The payment method of claim 14, wherein the unique information is any one of a telephone number of the payment device, an ESN (Electrical Serial Number), a UUID (Universal Unique Identifier) and a MAC ADDRESS.

16. The payment method of claim 14, wherein the payment device provides the dynamic track 2 information to the relay server through the card reader, thereby requesting payment.

17. The payment method of claim 14, wherein the dynamic track 2 information is formed by entirely encrypting remaining regions except for the BIN from the track 2 information.

18. The payment method of claim 14, wherein the dynamic track 2 information is formed by encrypting a remaining PAN region except from the BIN from the track 2 information.

19. The payment method of claim 14, wherein the dynamic track 2 information is returned in a state of being included in the message for approval request transmitted from the relay server.

20. The payment method of claim 14, wherein the payment device provides the dynamic track 2 information to the relay server through the card reader to request payment, and the message for approval request comprises any one of settlement fee information, the dynamic track 2 information, and affiliate member information regarding the card reader.

21. The payment method of claim 1, wherein the payment device transmits the one-time card information to the card reader using a near field communication.

22. A payment method using one-time information, which is performed by a payment system network-connected to a relay server and a payment device, the payment method comprising:
   dividing a PAN (Primary Account Number) region of track 2 information for the payment device into a first region including a BIN, and dividing remaining regions except for the BIN from the track 2 information into a second region and a third region;
   forming dynamic track 2 information by encrypting any one of the second region and the third region except for the first region;
   constituting the track 2 information by decrypting any one of the second region and the third region when the dynamic track 2 information is provided to the payment device, and the dynamic track 2 information is returned from the relay server; and
   judging a payment account of the payment device with reference to the decrypted track 2 information.

* * * * *